(12) United States Patent
Qin et al.

(10) Patent No.: US 7,180,754 B2
(45) Date of Patent: Feb. 20, 2007

(54) CONNECTING MECHANISM FOR A BATTERY CASE AND A BODY OF A PORTABLE ELECTRONIC DEVICE

(75) Inventors: Shui Yuan Qin, Shenzhen (CN); Chia-Hua Chen, Tu-Chen (TW); Yu-Chieh Lee, Tu-Chen (TW); Jiang Yuan He, Shenzhen (CN); Lin Hu, Shenzhen (CN); Changzhi Li, Shenzhen (CN)

(73) Assignees: Shenzhen Futaihong Precision Ind. Co., Ltd., Shenzhen (CN); Sutech Trading Limited, Tortola (VG)

( * ) Notice: Subject to any disclaimer, the term of this patent is extended or adjusted under 35 U.S.C. 154(b) by 276 days.

(21) Appl. No.: 10/843,511

(22) Filed: May 10, 2004

(65) Prior Publication Data

US 2004/0224556 A1 Nov. 11, 2004

(30) Foreign Application Priority Data

May 9, 2003 (TW) .............................. 92208551 U

(51) Int. Cl.
*H05K 7/14* (2006.01)
*H05K 7/18* (2006.01)
(52) U.S. Cl. ...................... 361/797; 361/755; 361/814; 455/575.1; 455/575.4
(58) Field of Classification Search ................ 361/797, 361/715, 755, 756; 455/575.4, 575.1, 566, 455/575.3; 16/366, 342, 303, 305
See application file for complete search history.

(56) References Cited

U.S. PATENT DOCUMENTS

| | | | | |
|---|---|---|---|---|
| 5,657,370 A | * | 8/1997 | Tsugane et al. | 455/566 |
| 6,963,756 B2 | * | 11/2005 | Lubowicki et al. | 455/550.1 |
| 6,980,840 B2 | * | 12/2005 | Kim et al. | 455/575.4 |
| 7,003,333 B2 | * | 2/2006 | Chow et al. | 455/575.3 |
| 2005/0124394 A1 | * | 6/2005 | Kim et al. | 455/575.3 |

* cited by examiner

Primary Examiner—Elvin Enad
Assistant Examiner—Hung S. Bui
(74) Attorney, Agent, or Firm—Wei Te Chung

(57) ABSTRACT

A connecting mechanism for a battery case and a main body of a portable electronic device includes a main body (10), a connecting member (20), a cover (30), and a shaft (40). The main body has a receptacle (162), and a recessed portion (192) for receiving the battery case. The connecting member has a body (22) and one or more mounting portions (24). The cover defines a sliding space. The shaft extends through the mounting portions and is received in the receptacle. Thus the connecting member is rotatable relative to the main body about the shaft. The connecting member is received in the sliding space and can slide along the sliding space relative to the cover. Thus the cover is both rotatable and slidable relative to the main body, and need not be detached from the main body.

12 Claims, 5 Drawing Sheets

CONNECTING MECHANISM FOR A BATTERY CASE AND A BODY OF A PORTABLE ELECTRONIC DEVICE

BACKGROUND OF THE INVENTION

1. Field of the Invention

This invention relates in general to portable electronic devices, and more specifically to a hinge-like connecting mechanism for a battery case and a body of a portable electronic device. This application is related to a contemporarily filed application titled "BATTERY COVER ASSEMBLY FOR PORTABLE ELECTRONIC DEVICE". and having the same assignee.

2. Prior Art

Portable electronic devices, such as mobile phones and personal digital assistants, are in widespread use around the world. These devices are provided with power via batteries, with a battery being removably received in a main body of the device.

For example, the Alcatel Corporation OT310 mobile phone has a pair of holders at an end of a battery case thereof, and a pin at an opposite end of the battery case. Corresponding to the battery case, the mobile phone has a pair of slots at an end of a main body thereof, and a hole at an opposite end of the main body. When attaching the battery case to the main body, the holders are received in the slots and the pin is inserted into the hole. The battery case is thus reliably attached to the main body.

It is important for the battery case to not only be firmly retained in the main body, but also to be easily removed when needed. Nevertheless, in general, a good deal of force needs to be exerted on the battery case for it to be detached. The battery case is easily damaged if excessive force is applied, both in the process of detaching the battery case and in the process of attaching the battery case.

In addition, the battery case is completely separated from the main body when the user changes the battery of the mobile phone. Therefore, the battery case is liable to be misplaced or accidentally damaged.

All the above-described difficulties cause the user undue inconvenience. A need exists for a new connecting mechanism for a battery case and a main body of a mobile phone in order to overcome the above-described problems.

SUMMARY OF THE INVENTION

Accordingly, an object of the present invention is to provide a connecting mechanism for a battery case and a body of a portable electronic device, so that a user can conveniently change a battery of the device and not risk misplacing the battery case.

In one aspect of the present invention, a connecting mechanism for a battery case and a body of a portable electronic device comprises a main body, a connecting member, a cover, and a shaft. The main body has a receptacle, and a recessed portion for receiving the battery case. The connecting member has a body and at least one mounting portion. In a preferred embodiment, two mounting portions are provided. The cover defines a sliding space. The shaft extends through the mounting portions and is received in the receptacle. Thus the connecting member is rotatable relative to the main body about the shaft. The connecting member is received in the sliding space and can slide along the sliding space relative to the cover. Thus the cover is both rotatable and slidable relative to the main body, and need not be detached from the main body.

Other objects, advantages and novel features of the present invention will be drawn from the following detailed description of the preferred embodiment of the present invention together with the attached drawings, in which:

DETAILED DESCRIPTION OF THE INVENTION

Figure 1:
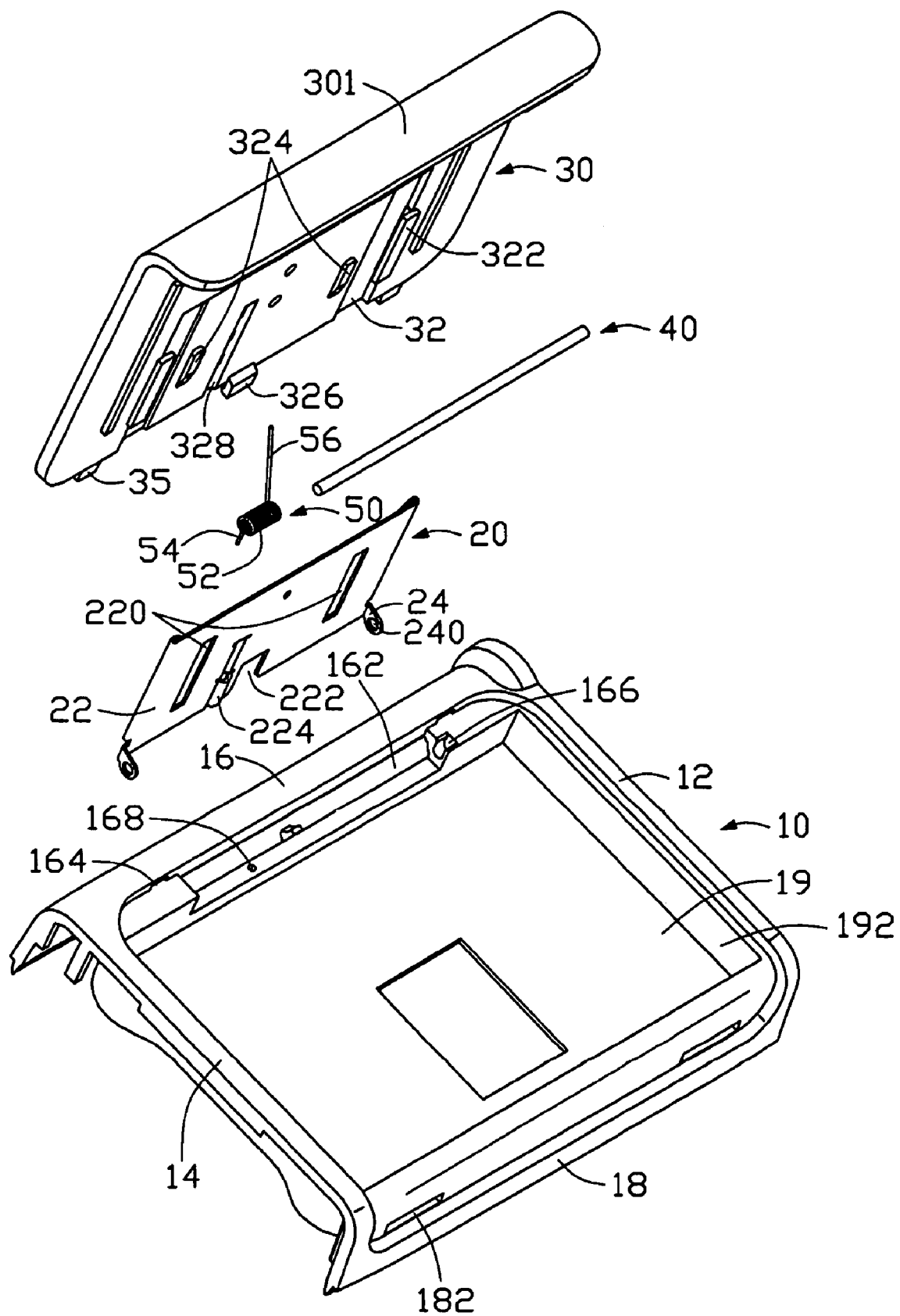
FIG. 1 is an exploded, isometric view of a connecting mechanism of the present invention.
Figure 2:
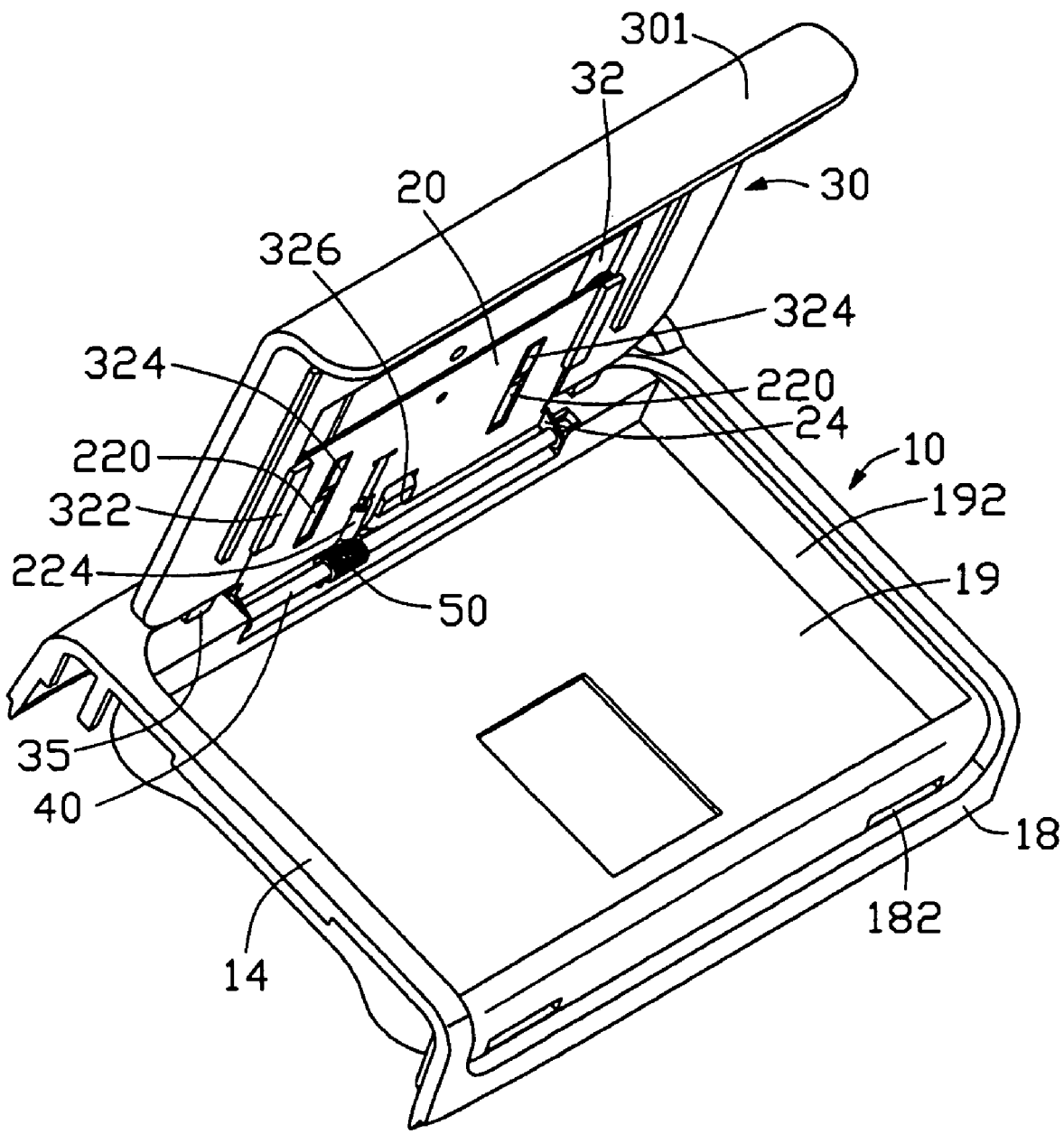
FIG. 2 is an assembled view of FIG. 1, showing a cover thereof in an open position.

Referring to FIGS. 1 2, the preferred embodiment of a connecting mechanism for a battery case and a body of a portable electronic device comprises a main body 10, a connecting member 20, a cover 30, a shaft 40 and a spring member 50.

The main body 10 includes an upper sidewall 12, a lower sidewall 14, a left sidewall 16, and a right sidewall 18. The upper sidewall 12, the lower sidewall 14, the left sidewall 16 and the right sidewall 18 cooperatively form a generally rectangular compartment (not labeled). The main body 10 further includes a partition 19 disposed in the compartment; thereby forming an upper recessed portion 192 for receiving a battery (not shown) of the portable electronic device, and a lower containing portion 194 (see FIG. 3) for housing electronic components of the portable electronic device such as a printed circuit board. The left sidewall 16 has a receptacle 162 and a pair of spaced sockets 164. The shaft 40 is received in the receptacle 162. The receptacle 162 includes a mounting part 166 and a hole 168. The right sidewall 18 has two spaced notches 182.

The connecting member 20 includes a body 22 and a pair of mounting rings 24. The body 22 has two parallel slots 220, an opening 222 spanning from one side edge thereof, and a channel 224 adjacent to the opening 222. Each mounting ring 24 has a through hole 240. The through holes 240 of the mounting rings 24 rotatably receive the shaft 40, so that the connecting member 20 can rotate about the shaft 40.

Figure 3:
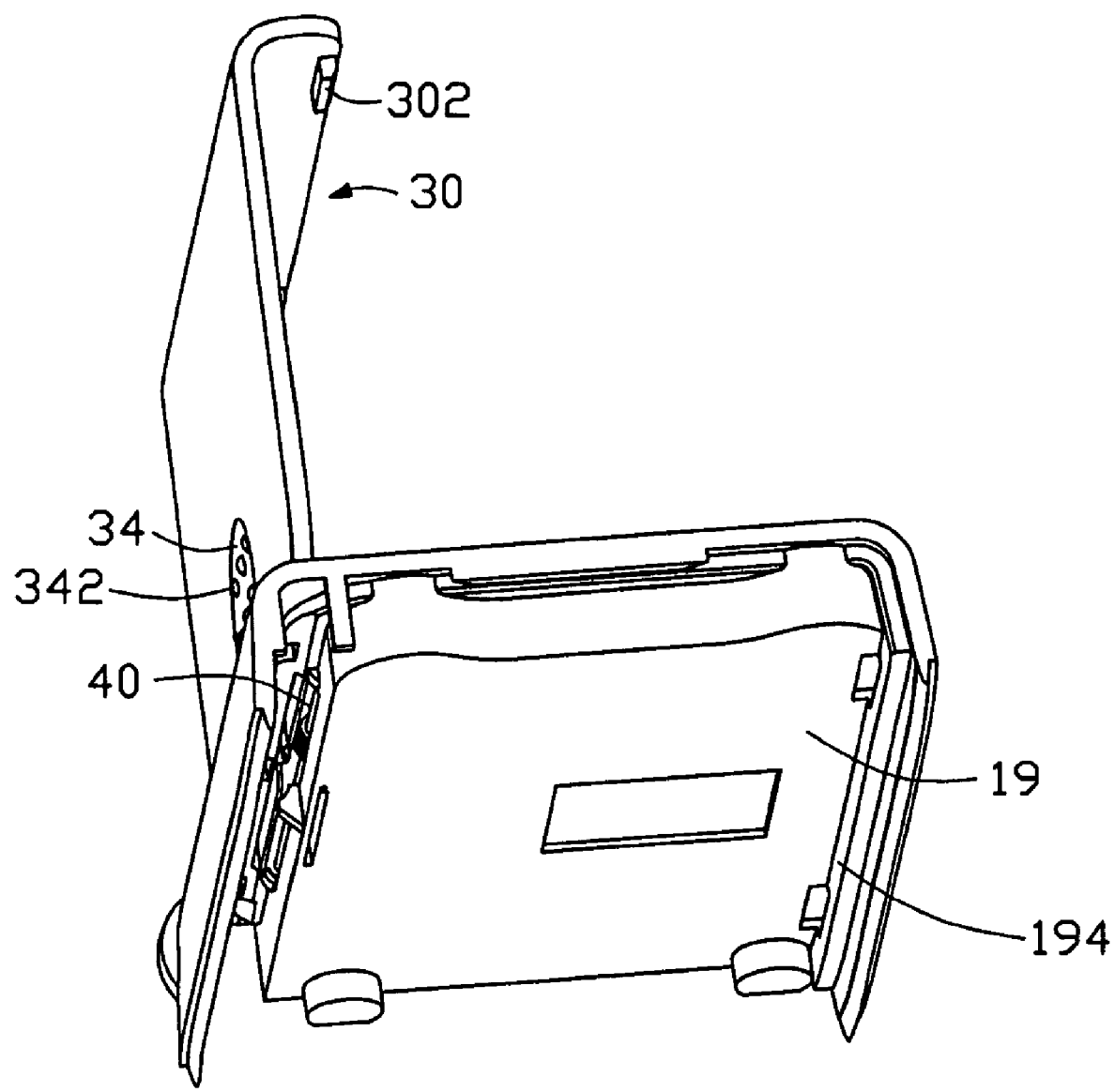
FIG. 3 is similar to FIG. 2, but viewed from a bottom aspect.

Referring also to FIG. 3, the cover 30 is substantially rectangular. The cover 30 includes a bent portion 301 at a right side thereof, and two spaced projections 302 (see FIG. 3) formed on an inner side of the bent portion 301. The projections 302 are engageable in the notches 182 of the right wall 18 so that the cover 30 is firmly engaged with the main body 10. The cover 30 defines a pair of parallel grooves 32 in an inner surface thereof. A pair of blocks 322 is formed on the inner surface of the cover 30. The blocks 322 are disposed at outer sides of the grooves 32 respectively, and partially underlie the respective grooves 32. A gap between the blocks 322 together with the grooves 32 cooperatively defines a sliding space (not labeled) for slidably receiving the connecting member 20. Two parallel guiding projections 324 are formed on the inner surface of the cover 30 between the grooves 32, for slidably engaging in the slots 220 of the connecting member 20. A holder 326 is formed at a middle of a left side edge of the cover 30. The holder 326 corresponds to the opening 222 of the connecting member 20. A slot 328 is defined in the inner surface of the cover 30 between the holder 326 and one of the guiding projections 324. A pair of spaced holders 35 is formed on the left side edge of the cover 30. The holders 35 can engage in the sockets 164 of the left side 16 of the main body 10. A circular press portion 34 is formed on an outer surface of the cover 30. The press portion 34 has a plurality of protrusions 342, for facilitating manual operation thereof.

The spring member 50 is generally cylindrical, and comprises a spring body 52, a resisting end 54 extending obliquely from the spring body 52, and an active end 56 extending perpendicularly from the spring body 52. The resisting end 54 is received in the hole 168 of the receptacle 162. The active end 56 is received in the channel 224 and biases the cover 30 in the slot 328.

In pre-assembly, the connecting member 20 is received in the sliding space of the cover 30 so that it can slide relative to the cover 30. The guiding projections 324 are slideably received in the slots 220 of the connecting member 20. The holder 326 can slide in the opening 222. The projections 302 of the cover 30 can engage in the notches 182 of the main body 10.

Figure 4:
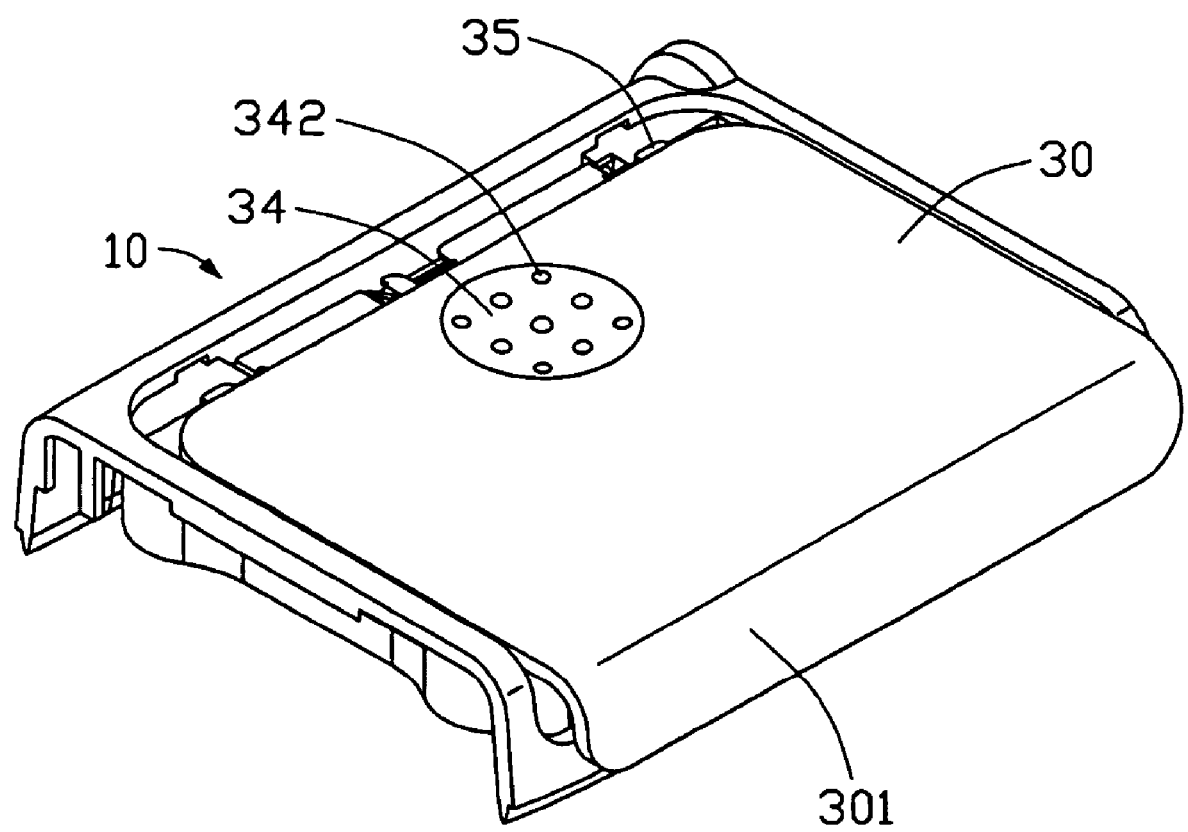
FIG. 4 is similar to FIG. 2, but showing the cover in a partly closed position.
Figure 5:
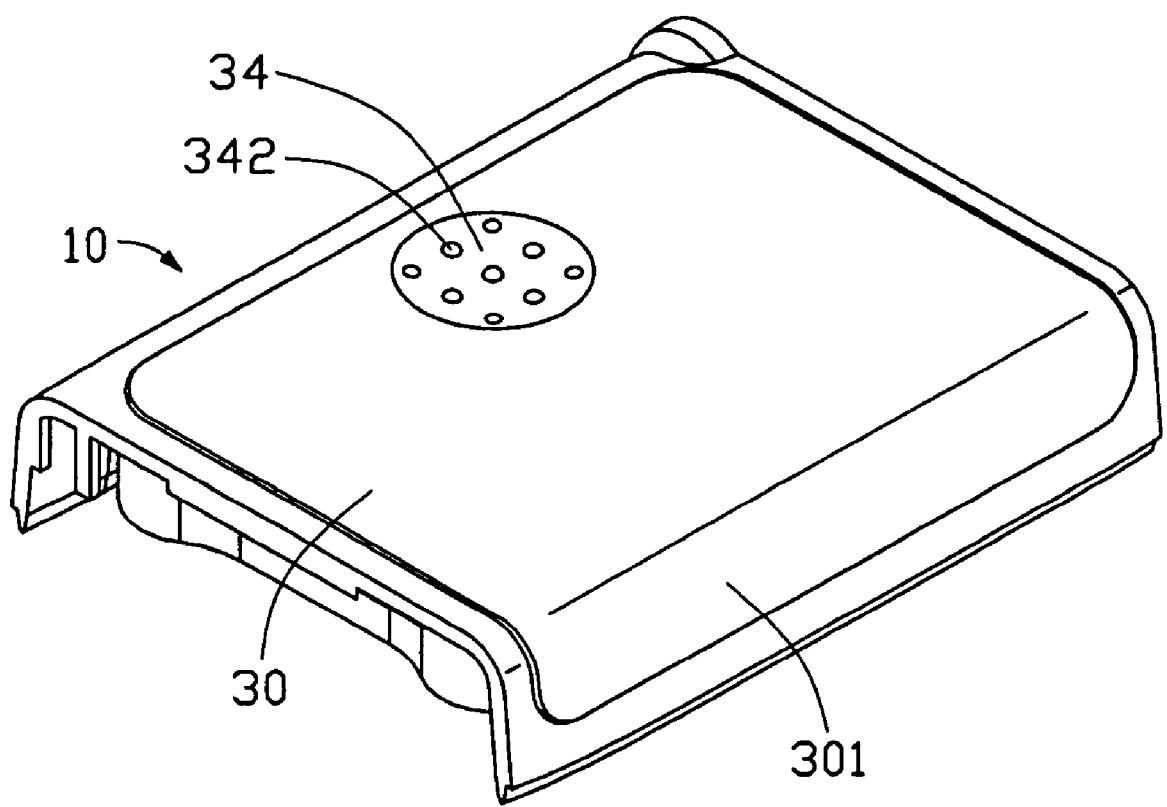
FIG. 5 is similar to FIG. 4, but showing the cover in a fully closed position.

Referring also to FIGS. 3–5, in assembly, the active end 56 of the spring member 50 is received in the channel 224 of the connecting member 20 and the slot 328 of the cover 30, with the spring 50 being located between the mounting rings 24 of the connecting member 20. The shaft 40 is extended through the mounting rings 24 and the spring body 52. The shaft 40 is mounted in the receptacle 162, with one end of the shaft 40 engaged in the mounting part 166, and the resisting end 54 of the spring 52 received in the hole 168. The cover 30 is thus rotatably secured to the main body 10 via the connecting member 20.

In operation, when the cover 30 is in the open position (see FIG. 2), a user can load a battery (not shown) into the recessed portion 192 of the main body 10. Then the combined cover 30 and connecting member 20 is rotated about the shaft 40 down to the main body 10. At the same time, the spring 50 is compressed. When the cover 30 is parallel to the main body 10 in the partly closed position (see FIG. 4), the user can push the press portion 34 toward the shaft 40 so that the cover 30 slides relative to the connecting member 20. The holders 35 of the cover 30 are engagingly received in the sockets 164 of the main body 10, and the projections 302 of the cover 30 are engagingly received in the notches 182 of the main body 10.

When the user wants to change the battery, he/she can press the press portion 34 away from the shaft 40 so that the cover 30 slides relative to the connecting member 20. The holders 35 of the cover 30 are disengaged from the sockets 164 of the main body 10, and the projections 302 of the cover 30 are disengaged from the notches 182 of the main body 10. The cover 30 thus reaches the partly closed position. The spring member 50 decompresses, and rotates the cover 30 up about the shaft 40 to the open position.

In an alternative embodiment, the spring member 50 and associated parts of the main body 10, the connecting member 20 and the cover 30 can be omitted. Assembly of the alternative embodiment is substantially the same as that described above in relation to the preferred embodiment. The cover 30 is freely rotated down from the open position to the partly closed position. The cover 30 is manually rotated up from the partly closed position to the open position.

In a further alternative embodiment, a plurality of the spring members 50 can be employed, together with a plurality of the associated parts of the main body 10, the connecting member 20 and the cover 30. With such configuration, the spring members 50 provide ample force for the cover 30 to rotate up from the partly closed position to the open position.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A connecting mechanism for a battery case and a body of a portable electronic device, comprising:
    a main body, having a receptacle;
    a connecting member, having a body and at least one mounting portion;
    a cover defining a sliding space;
    a shaft extending through said at least one mounting portion and mounted in the receptacle;
    wherein the connecting member is slidably received in the sliding space of the cover, and the connecting member is rotatable together with the cover about the shaft;
    wherein the cover defines at least one groove in an inside thereof, at least one block is formed on the inside of the cover at an outer side of said at least one groove such that it partially underlies said at least one groove, and a space defined by said at least one block together with said at least one groove cooperatively defines the sliding space;
    wherein the cover includes a bent portion at one side thereof, at least one projection is provided on an inside of the bent portion, a sidewall of the main body defines at least one notch, and said at least one projection of the bent portion is engaged in said at least one notch of the sidewall of the main body when the cover is in a fully closed position; and
    wherein a guiding projection is formed on an inside of the cover, the connecting member defines a slot, and the guiding projection is slidably received in the slot.

2. The connecting mechanism as claimed in claim 1, wherein a side of the main body defines at least one socket, a side of the cover opposite to the bent portion provides at least one holder, and said at least one holder engages in said at least one socket when the cover is fully closed.

3. The connecting mechanism as claimed in claim 1, wherein a press portion is formed on an outside of the cover, and the press portion has a plurality of protrusions tin facilitating manual operation thereof.

4. The connecting mechanism as claimed in claim 1, wherein the connecting mechanism further includes a spring member, which is received in the receptacle.

5. The connecting mechanism as claimed in claim 4, wherein the main body has a hole defined at a bottom of the receptacle, the cover has a slot defined in an inner surface thereof, and the spring member has a spring body, a resisting end extending obliquely from the spring body, and an active end extending perpendicularly from the spring body, the resisting end and the active end being respectively received in the hole of the main body and the slot of the cover.

6. The connecting mechanism as claimed in claim 1, wherein the at least one mounting portion is a pair of mounting rings defining a through hole, and the shaft extends through the through hole.

7. A connecting mechanism for a battery case and a body of a portable electronic device, comprising:

a main body, having a receptacle;

a connecting member, having a body and at least one mounting portion;

a cover defining a sliding space;

a shaft;

a spring member;

wherein the shaft extends through said at least one mounting portion and the spring member and is received in the receptacle, the connecting member is rotatable about the shaft, and the connecting member is received in the sliding space and can slide along the sliding space relative to the cover, and the cover is rotatably secured to the main body via the connecting member;

wherein the cover defines at least one groove in an inside thereof, and at least one block is formed on the inside of the cover at an outer side of said at least one groove such that said at least one block partially underlies said at least one groove, and a space defined by said at least one block together with said at least one groove cooperatively defines the sliding space;

wherein the cover includes a bent portion at one side thereof, and at least one projection is provided on an inside of the bent portion, a sidewall of the main body defines at least one notch, and said at least one projection of the cover is engaged in said at least one notch of the main body when the cover is fully closed; and wherein a guiding projection is formed on an inside of the cover, the connecting member defines a slot, and the guiding projection is slidably received in the slot.

8. The connecting mechanism as claimed in claim 7, wherein a side of the main body defines at least one socket, a side of the cover opposite to the bent portion provides at least one holder, and said at least one holder engages in said at least one socket when the cover is fully closed.

9. The connecting mechanism as claimed in claim 7, wherein the receptacle comprises a mounting part, for securing the shaft to the main body.

10. The connecting mechanism as claimed in claim 7, wherein the spring member is generally cylindrical, and includes a spring body, a resistinig end extending obliquely from the spring body, and an active end extending perpendicularly from the spring body.

11. The connecting mechanism as claimed in claim 10, wherein the main body has a hole defined at a bottom of the receptacle, and the cover has a slot defined in an inner surface thereof, the resisting end and the active end being respectively received in the hole of the main body and the slot of the cover.

12. The connecting mechanism as claimed in claim 7, wherein a press portion is formed on an outside of the cover, and the press portion has a plurality of protrusions for facilitating manual operation thereof.

* * * * *